Feb. 4, 1930.  R. O. BEARDSLEY  1,745,523
APPARATUS FOR TESTING TAPER THREADED SCREWS
Filed Sept. 20, 1927
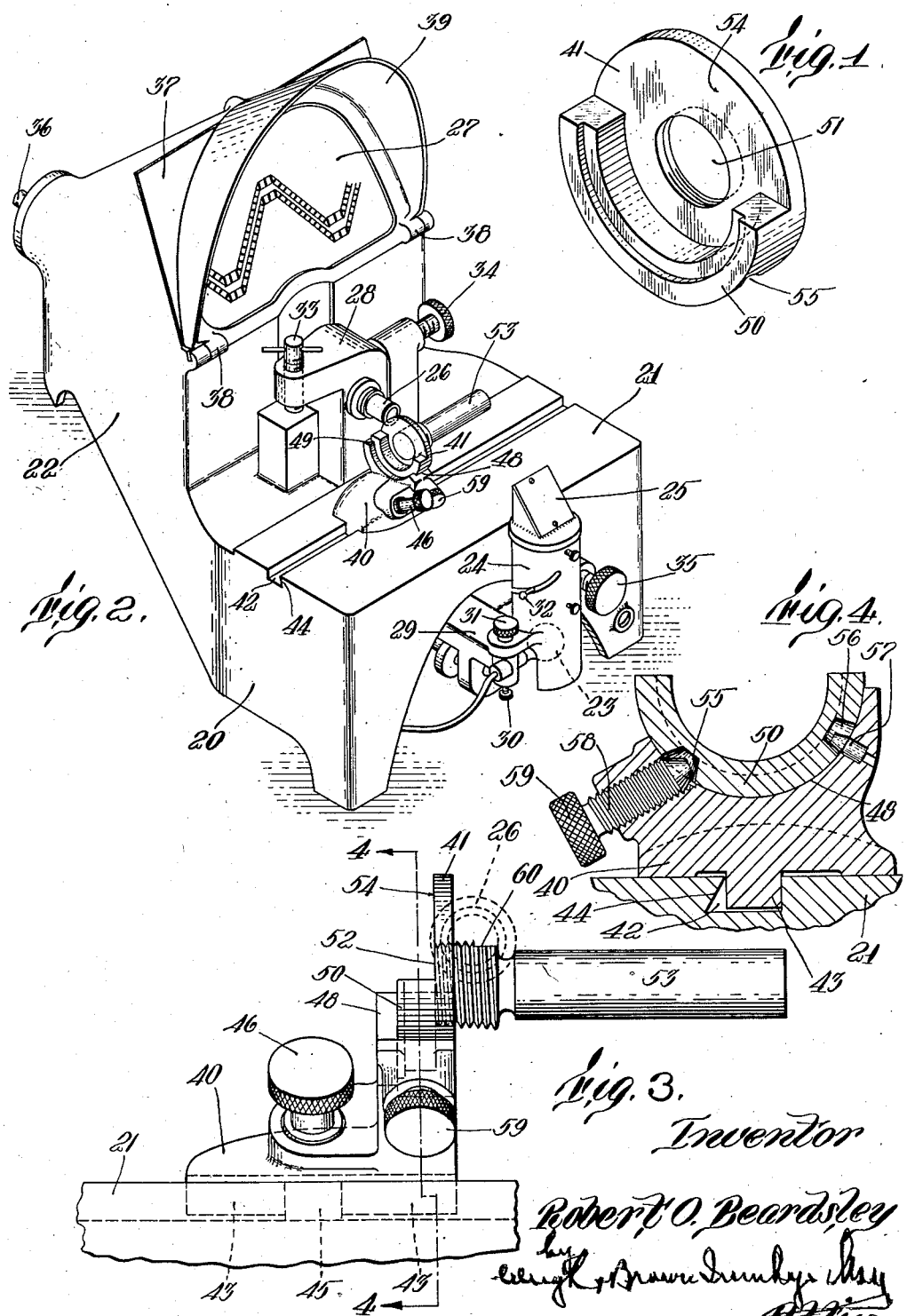
Inventor
Robert O. Beardsley Patented Feb. 4, 1930

1,745,523

UNITED STATES PATENT OFFICE

ROBERT O. BEARDSLEY, OF SPRINGFIELD, VERMONT, ASSIGNOR TO JONES & LAMSON MACHINE COMPANY, OF SPRINGFIELD, VERMONT, A CORPORATION OF VERMONT

APPARATUS FOR TESTING TAPER-THREADED SCREWS

Application filed September 20, 1927. Serial No. 220,702.

This invention relates to apparatus for testing taper-threaded elements for the purpose of discovering errors of diameter, pitch, form, taper, or otherwise, of the threads, by comparison of an outline image of a thread of each element to be tested with the image or representation of a corresponding thread of a master gage, the images being preferably enlarged and thrown on a suitable screen. Such apparatus may conveniently comprise a comparator such as is for the most part described and claimed in an application of Hartness and Porter, Serial No. 31,746, filed May 21, 1925, the comparator as therein shown, however, constituting no part of this invention. By my invention, I provide a comparator with a novel cradle adapted for holding taper-threaded elements in such a manner that the various errors to which the threads of such elements are subject can be readily detected. For brevity, the threaded elements are hereinafter referred to as "screws", but it is to be understood that the invention applies to all manner of taper-threaded elements such as taps, bolts, pipes and the like.

The efficacy in use of the threads of a screw depends on a number of different factors. These factors include the lead or pitch of the thread, the diameter of the screw taken at the mean depth of the thread, the form or profile of the thread, the smoothness and density of the surface, and in the case of tapered threads, the amount of taper. An object of this invention is to provide a holder for use with apparatus for determining the quality of taper threads, the holder being capable of permitting quick and accurate placing of the screw to be inspected so that the various elements of the quality of the thread will be at once apparent.

In carrying out this invention, I provide a comparator with a cradle having a perforation with a taper thread to receive a master gage, the perforation being preferably of a size to permit the end face of the tapered gage to come flush with a face of the cradle. While not limited thereto, the cradle may be constructed for use in combination with a carriage having clamping means such that the cradle can be removed from the carriage and replaced in its exact previous position so that removal and replacement of the cradle will not necessitate a readjustment of the carriage with relation to other elements of the comparator. The clamping means per se is however not a part of this invention.

Further advantageous features will be apparent to one skilled in the art from the disclosure of the invention in the following description and on the drawings, of which,—

Figure 1 is a perspective view of a cradle embodying my invention.

Figure 2 is a perspective view of a comparator including my improved cradle.

Figure 3 is a side elevation of my improved cradle and a carriage for holding it in position.

Figure 4 is a section on the line 4—4 of Figure 3.

Referring to Figure 1, the comparator as a whole consists of a suitable base 20 which is provided with a normally horizontal table 21 and may be made integral with an enclosed chamber 22. The base and chamber support an optical system whereby a beam of light may be directed substantially tangent to a thread of a screw or bolt to be observed, and the shadow or outline image of such thread thrown upon a suitable screen. This optical system as shown comprises a light bulb 23 mounted in an upright tube 24 which contains a suitable condensing lens (not shown) to collect the rays of light and direct them to a reflecting prism 25 from which they pass across the thread to be observed and enter a suitable microscope indicated at 26. The light then passes to a suitable reflector mounted at the further end of the chamber 22 at an angle to reflect the rays to a translucent screen or chart 27. The microscope 26 may be selected to magnify the outline image of the screw thread to any desired number of diameters. In practice it is found that from fifty to two hundred diameters give a sufficient magnification for the desired purpose. The light 23, the prism 25, the condensing lens between them, and the microscope 26 are all carried by a single yoke comprising the upright tube 24, an upright member 28 and a horizontal connecting member 29. The position of the lamp 23 in the tube 24 is adjustable by means of suitable screws 30, 31. The condensing lens may be moved up or down the tube 24 as by a projecting handle 32. Thus the elements of the optical system which are carried by the yoke are adjustable with relation to each other, but may be moved together with the yoke without altering the adjustment between themselves. The yoke is supported by suitable links, springs, or other supports which permit it a certain amount of adjusting motion. Adjustments of the position of the yoke itself may be made as by suitable screws 33, 34, 35. The mirror which reflects a beam of light from the microscope to the screen may be pivotally mounted on a stem 36 so as to be adjustable in all directions to throw the outline image of the screw thread upon the screen 27 as desired. The screen or chart 27 is preferably removable and may be held by suitable clips (not shown) in a chart holder 37 which may be pivoted as at 38 to a wall of the chamber 22. A suitable hood 39 prevents surface glare on the screen 27 and thus makes the image on the screen stand out more clearly. A series of charts 27 may be provided for different sizes or kinds of screw threads, these charts being easily interchangeable in the chart holder 37.

In order to make a true and accurate comparison of screw threads with a standard thread, it is essential that each screw which is observed be definitely and accurately located with respect to some fixed point of reference. To this end a carriage 40 of substantial structure is provided which is constructed to receive a cradle 41 and to clamp the cradle firmly into a fixed position. The carriage 40 is preferably adjustable in a horizontal line approximately at right angles to the direction of the beam of light passing from the reflector 25 to the microscope 26, so that the beam is in line with the helix angle of the thread. The table 21 may be provided with a suitable channel 42 which receives suitable lugs 43 formed on the bottom of the carriage 40. In order to secure the carriage firmly in any desired position, the channel 42 may be undercut as at 44, this undercut portion being adapted to receive a movable block 45 which is carried between the lugs 43 of the carriage and may be moved into locking position as by a knurled member 46 interiorly threaded to engage a stem which may be formed integrally with the block 45. The carriage 40 is provided with an arcuate recessed portion 48 to receive the cradle 41. The arcuate portion 48 is also provided with a shoulder 49 against which the cradle may seat. The cradle itself as shown in Figure 3 comprises a suitable disk provided with a flange 50 which is comparatively heavy and is adapted to engage in the recess and against the shoulder 49 of the carriage 40. In order to make it easier for the operator to watch both faces of the disk of the cradle 41, the flange 50 is extended over only a portion of the circumference, leaving the upper portion of the disk clear for inspection. The disk is provided with a central perforation 51 which is tapered and threaded so as to be fitted exactly by a master taper screw thread with which the work is to be compared. Since the progress of a tapered screw member through a correspondingly threaded aperture is definitely limited by the taper, the aperture 51 is preferably made of such a size that the end face 52 of a master gage 53 will be substantially flush with the face 54 of the disk member of the cradle when the master gage is screwed through the aperture 51 as far as it will go. This provides a definite stop for the location of each screw to be observed with reference to the cradle. The cradle itself may be clamped to the carriage by any suitable means. As shown, a pair of conical recesses 55, 56 are formed in the periphery of the flange 50, the recess 56 being adapted to receive the tapered end of a fixed pin 57 which is permanently set into the cradle holding portion 48 of the carriage 40. The recess 55 is adapted to receive the tapering end of a screw member 58 which is threaded through a portion of the carriage 40 and is provided with a knurled head 59 by which its end may be advanced into or retracted from the recess 55. The axes of the pin 57 and the screw 58 are not in the plane of the axes of the recesses 55, 56, but are displaced laterally toward the shoulder 49. When the screw 58 is set up so that its end enters the recess 55, the flange 50 is moved against the pin 57 and the reaction of the flange against the pin 57 and the screw 58 clamps the cradle tightly into the arcuate recess of the carriage 40 and against the shoulder 49 so that its position relative to the carriage is definite, and it may be easily removed and accurately replaced. Since the successive convolutions of a taper thread are of increasing or decreasing diameter, the aperture 51 of the cradle 41 is formed, as previously stated, so as to fit at its face 54 the smallest diameter of the master gage, this bringing the end face 52 of the master gage flush with the face 54 of the cradle. The thread of larger diameter, the outline image of which is to be cast upon the screen 27 for the purpose of comparison, may be conveniently indicated on the master gage by a flat 60 ground thereon.

In using the comparator for the inspection of taper threads, a master gage 53 is first screwed into the aperture 51, the apparatus of the comparator having previously been assembled in position. The carriage 40 may then be adjusted in the slot 42 to bring the thread of the gage 53, the image of which is to be thrown on the screen, directly in line with the beam of light from the reflector 25, the thread to be observed being spaced from the threads by which the gage is supported by the cradle so as to reveal errors of pitch and taper when screws to be tested are held by the cradle. The yoke carrying the optical system is then adjusted so as to bring the magnified outline of the master thread in contact with the upper of the two broken lines of tolerance shown on the chart 27, in Figure 1. The apparatus is now ready for use in the inspection of screws, bolts, taps or any other kind of taper-threaded members which are to be compared with the thread of the master gage 53. Each screw to be compared is quickly and easily screwed into the aperture 51 as far as it will go and the outline image of its corresponding thread of larger diameter observed on the screen 27. The errors of the thread may be at once clearly detected on account of the great magnification of the image. It can be seen instantly whether the errors of the thread come within the limit of tolerance or not, and what the nature of the errors of the thread may be. Thus errors in diameter, lead, and taper, are at once detected as well as roughness of cut or imperfections of surface left by the cutting tool. If, for example, the taper is correct but the end diameter is too small, the work will pass through the perforation 51 to such an extent that its end will project out beyond the face 54 of the cradle and the portion of the thread cut by the throat of the chaser will show on the chart. If the end diameter is too large, the work will not enter the aperture 51, or if it enters, the small end will not progress through the aperture 51 to the further face 54 of the cradle. If the lead of the thread is short, the outline image on the chart 27 will be displaced to the left, whereas if the lead of the thread is long, the displacement will be toward the right. It will be noted that when a screw is screwed into the cradle aperture as far as it will go, its diameter at the point of engagement with the cradle will be that of the cradle aperture so that the diameter of the screw at the point where the light beam passes it will be in each case compared with a standard diameter at a constant distance, hence a taper of the thread of a screw which is less than standard will result in the crest of the observed thread being lower than it should appear in the chart, while too great a taper of the thread will show the crest of the image of the thread above the upper line of tolerance.

Having thus described certain embodiments of this invention, it should be evident to those skilled in the art that various changes and modifications may be made therein without departing from its spirit or scope as defined by the appended claims.

I claim:—

1. An apparatus for gaging taper screws, comprising means for definitely locating a portion of predetermined diameter of a taper-threaded screw, a tolerance chart, means for projecting on said chart an outline image of a portion of said screw longitudinally spaced from said first mentioned portion, and means for supporting said locating means, projecting means, and chart in adjustably fixed relation to one another.

2. An apparatus for gaging taper screws, comprising a work-supporting cradle having a taper-threaded, work-receiving perforation, means for producing a magnified outline image of a portion of the thread of the screw longitudinally spaced from the portion engaged in said perforation, and a chart on which said magnified image may be viewed, said chart having indicated thereon the boundaries of tolerance, similarly magnified, of a portion of the thread outline of a standard screw.

3. In combination with apparatus for gaging tapered screw threads, a cradle comprising a member having an internally threaded tapering perforation adapted to receive work, and means for securing said cradle in definite predetermined relation to said apparatus.

4. Apparatus of the class described, comprising a work-holding cradle having a face and a perforation therethrough, said perforation being tapered and threaded to receive a taper thread gage therethrough to a limiting position wherein the end of the gage is substantially flush with said face.

5. Apparatus of the class described, comprising a work-holding cradle having a tapered perforation threaded to receive a master taper thread gage therethrough to a limiting position wherein a certain portion of the gage is in predetermined longitudinal relation to a certain portion of the cradle.

6. Apparatus of the class described, comprising a work-receiving cradle having a stop engageable by a portion of the work of predetermined diameter to limit adjusting movement of work along its own axis relative to the cradle.

7. Apparatus of the class described, comprising a carriage having a cradle-receiving recess, a work-holding cradle having a perforation therethrough, said perforation being tapered and threaded to fit over a portion of a master taper thread gage, and means for removably securing said cradle in a definite position relative to said carriage.

8. The method of gaging taper threads, which comprises screwing a master gage into a tapered threaded aperture as far as it will go, projecting on a chart the image of a portion of the thread spaced longitudinally from said aperture, relatively locating said image with marks on the chart, removing said master gage from the aperture, screwing work to be compared into the aperture as far as it will go, throwing the image of the corresponding spaced portion of the thread upon the chart, and comparing said image of the work with the marks on the chart.

9. The method of gaging a taper screw thread which comprises positioning a master gage against a definite longitudinal stop, projecting on a chart an outline image of a thread of said gage longitudinally spaced from said stop, relatively locating said image with marks on the chart, replacing said gage with work to be gaged, projecting on the chart the image of a corresponding thread of the work, and comparing said image of the work with the marks on the chart.

10. The method of gaging taper threads, which comprises projecting a beam of light across the periphery of a taper-threaded element in a transverse plane spaced by a predetermined distance from a parallel plane which cuts said element at a point of predetermined diameter, projecting the outline image of the thread in the path of said beam of light on a screen, and comparing said image with an indicated image of a corresponding master thread.

In testimony whereof I have affixed my signature.

ROBERT O. BEARDSLEY.